(12) United States Patent
Ueda et al.

(10) Patent No.: US 11,483,511 B2
(45) Date of Patent: Oct. 25, 2022

(54) INFORMATION PROCESSING DEVICE AND CONNECTOR SWITCHING METHOD

(71) Applicant: Panasonic Intellectual Property Management Co., Ltd., Osaka (JP)

(72) Inventors: Hironori Ueda, Kyoto (JP); Shinya Sato, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 367 days.

(21) Appl. No.: 16/928,703

(22) Filed: Jul. 14, 2020

(65) Prior Publication Data

US 2020/0344434 A1 Oct. 29, 2020

Related U.S. Application Data

(63) Continuation of application No. PCT/JP2018/046902, filed on Dec. 20, 2018.

(30) Foreign Application Priority Data

Jan. 25, 2018 (JP) .............................. JP2018-010697

(51) Int. Cl.
*H04N 5/44* (2011.01)
*G06F 13/40* (2006.01)

(52) U.S. Cl.
CPC ........... *H04N 5/44* (2013.01); *G06F 13/4022* (2013.01)

(58) Field of Classification Search
None
See application file for complete search history.

(56) References Cited

U.S. PATENT DOCUMENTS 8,817,186 B1 * 8/2014 Lin .................. G09G 5/006
  348/555
10,331,579 B2 * 6/2019 Gupta ................. G06F 13/4282
  (Continued)

FOREIGN PATENT DOCUMENTS

JP   11-272250 A   10/1999
JP   2012-014344 A   1/2012
  (Continued)

OTHER PUBLICATIONS

International Search Report for corresponding Application No. PCT/JP2018/046902, dated Mar. 5, 2019.

*Primary Examiner* — Idriss N Alrobaye
*Assistant Examiner* — Dayton Lewis-Taylor
(74) *Attorney, Agent, or Firm* — Renner, Otto, Boisselle & Sklar, LLP

(57) ABSTRACT

An information processing device includes a processor, a plurality of connectors that output video signals to a plurality of connected external displays, a plurality of detectors that detect connection states of the plurality of connectors to the plurality of external displays, a plurality of switches that switch paths between a plurality of output ports and the plurality of connectors, and a controller that controls a switching operation of the plurality of switches. The controller has setting information that defines a relationship between the connection states of the plurality of connectors and at least one connector that outputs at least one of video signals among the plurality of connectors, and controls a switching operation of the plurality of switches based on the connection states detected by the plurality of detectors and the setting information. The setting information is set by the user.

7 Claims, 11 Drawing Sheets

(56) References Cited

U.S. PATENT DOCUMENTS

| | | | | |
|---|---|---|---|---|
| 2012/0002108 | A1* | 1/2012 | Chiba | G09G 5/006 |
| | | | | 348/453 |
| 2014/0019653 | A1* | 1/2014 | Amchislavsky | G06F 13/385 |
| | | | | 710/106 |
| 2015/0006872 | A1* | 1/2015 | Sonobe | G09G 5/006 |
| | | | | 713/2 |
| 2016/0077786 | A1* | 3/2016 | Kizaki | G06F 1/1684 |
| | | | | 345/1.1 |
| 2018/0074546 | A1* | 3/2018 | DeCamp | G06F 13/4282 |
| 2020/0413005 | A1* | 12/2020 | Yamamoto | H04N 7/104 |

FOREIGN PATENT DOCUMENTS

| | | |
|---|---|---|
| JP | 2014-087018 A | 5/2014 |
| JP | 2015-011572 A | 1/2015 |

\* cited by examiner

FIG. 4

TABLE 1 (HDMI PRIORITY)

| No. | CONNECTION STATE ||| VIDEO OUTPUT ||||
|---|---|---|---|---|---|---|---|
| | Type-C (TB) | HDMI | VGA | MODE | TB (DisplayPort) | HDMI | VGA |
| 1 | ○ | - | - | TB MODE | TWO SCREENS | - | - |
| 2 | ○ | ○ | - | HDMI MODE | ONE SCREEN | ○ | - |
| 3 | ○ | ○ | ○ | HDMI MODE | ONE SCREEN | ○ | × |
| 4 | ○ | - | ○ | TB MODE | TWO SCREENS | - | × |
| 5 | - | ○ | ○ | VGA MODE | - | ○ | ○ |

TABLE 2 (TB PRIORITY)

| No. | CONNECTION STATE ||| VIDEO OUTPUT ||||
|---|---|---|---|---|---|---|---|
| | Type-C (TB) | HDMI | VGA | MODE | TB (Displayport) | HDMI | VGA |
| 1 | ○ | - | - | TB MODE | TWO SCREENS | - | - |
| 2 | ○ | ○ | - | TB MODE | TWO SCREENS | × | - |
| 3 | ○ | ○ | ○ | TB MODE | TWO SCREENS | × | × |
| 4 | ○ | - | ○ | TB MODE | TWO SCREENS | - | × |
| 5 | - | ○ | ○ | VGA MODE | - | ○ | ○ | ns
INFORMATION PROCESSING DEVICE AND CONNECTOR SWITCHING METHOD

TECHNICAL FIELD

The present disclosure relates to an information processing device including a connector for outputting a video signal and a connector switching method.

BACKGROUND ART

PTL 1 discloses a computer system including a built-in display, a digital interface connector to which an external display can be connected, and an analog RGB connector to which an external CRT monitor can be connected. The computer system of PTL 1 can output video signals to both a built-in display and an external display or an external CRT monitor.

CITATION LIST

Patent Literature

PTL 1: Unexamined Japanese Patent Publication No. 11-272250

SUMMARY

The present disclosure provides an information processing device and a method that allow a user to set a priority of an interface connector that outputs a video signal.

An information processing device according to an aspect of the present disclosure includes a processor having a plurality of output ports configured to output video signals; a plurality of connectors configured to be connected to a plurality of external displays and output the video signals to the plurality of connected external displays; a plurality of detectors for detecting connection states of the plurality of connectors to the plurality of external displays; a plurality of switches that intervene between the plurality of output ports and the plurality of connectors and switch paths between the plurality of output ports and the plurality of connectors; and a controller for controlling a switching operation of the plurality of switches.

The controller has setting information that defines a relationship between the connection states of a plurality of connectors and at least one connector that outputs at least one of video signals among the plurality of connectors, controls the switching operation of the plurality of switches based on the connection states detected by the plurality of detectors and the setting information. The setting information is set by the user.

A method of switching connectors that output video signals in an information processing device including a plurality of connectors connected to a plurality of external displays according to an aspect of the present disclosure includes: storing, on a recording medium, setting information that is set by a user and that defines a relationship between connection states of the plurality of connectors and at least one connector that outputs at least one of the video signals among the plurality of connectors; detecting the connection states of the plurality of connectors to the plurality of external displays; and determining at least one connector that outputs at least one of the video signals among the plurality of connectors based on the detected connection states and the setting information.

According to the present disclosure, the user can freely set a priority of an interface connector that outputs a video signal.

BRIEF DESCRIPTION OF DRAWINGS

FIG. 4 is a diagram exemplifying tables 1, 2 of FIG. 3.

DESCRIPTION OF EMBODIMENTS

Exemplary embodiments will now be described below in detail with reference to the drawings as appropriate. However, descriptions in more detail than necessary may be omitted. For example, detailed descriptions of well-known matters and duplicate descriptions of substantially identical configurations may be omitted. This is to avoid unnecessarily redundancy in the following description, and to facilitate understanding by those skilled in the art.

The inventors of the present disclosure provide the accompanying drawings and the following description in order to allow those skilled in the art to fully understand the present disclosure, and do not intend to limit the subject matter described in the appended claims by the accompanying drawings and the following description.

First Exemplary Embodiment 1-1. Configuration

Figure 1:
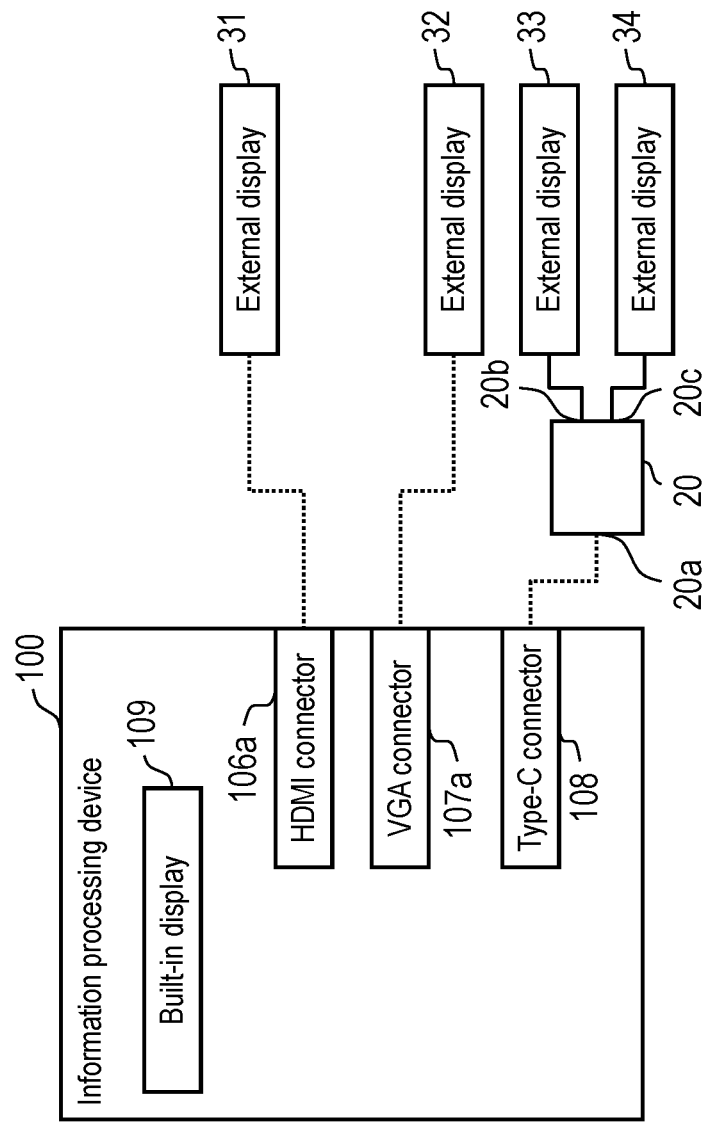
FIG. 1 is a diagram illustrating a connection between information processing device 100 and an external display according to an exemplary embodiment of the present disclosure.

FIG. 1 is a diagram illustrating a connection between information processing device 100 and external displays 31 to 34 according to the exemplary embodiment of the present disclosure. Information processing device 100 includes built-in display 109. Further, information processing device 100 includes a plurality of interface connectors 106a, 107a, 108 for connecting external displays 31 to 34. Information processing device 100 can output video signals to external displays 31 to 34 by connecting to external displays 31 to 34 via interface connectors 106a, 107a, 108.

Specifically, information processing device 100 includes HDMI connector 106a capable of communication conforming to the HDMI (registered trademark) standard, VGA connector 107a capable of communication conforming to the VGA (registered trademark) standard, and Type-C connector 108 capable of communication conforming to the Thunderbolt3 (hereinafter, referred to as TB) standard. Type-C connector 108 is a connector conforming to the USB Type-C standard.

Two external displays 33, 34 can be connected to Type-C connector 108 via converter 20. Converter 20 includes connector 20a capable of communication conforming to the TB standard. Converter 20 further includes two connectors 20b, 20c capable of communication conforming to the DisplayPort (registered trademark) (hereinafter, referred to as DP) standard. Information processing device 100 outputs a signal conforming to the TB standard to converter 20 via Type-C connector 108. Converter 20 converts the input signal conforming to the TB standard into a video signal conforming to the DP standard. Converter 20 outputs the video signal conforming to the DP standard to two external displays 33, 34 via connectors 20b, 20c, respectively.

Display 31 capable of inputting a video signal conforming to the HDMI standard is connected to HDMI connector 106a. Display 32 capable of inputting a video signal conforming to the VGA standard is connected to VGA connector 107a. Two external displays 33, 34 capable of inputting a video signal conforming to the DP standard are connected to Type-C connector 108 via converter 20.

Figure 2:
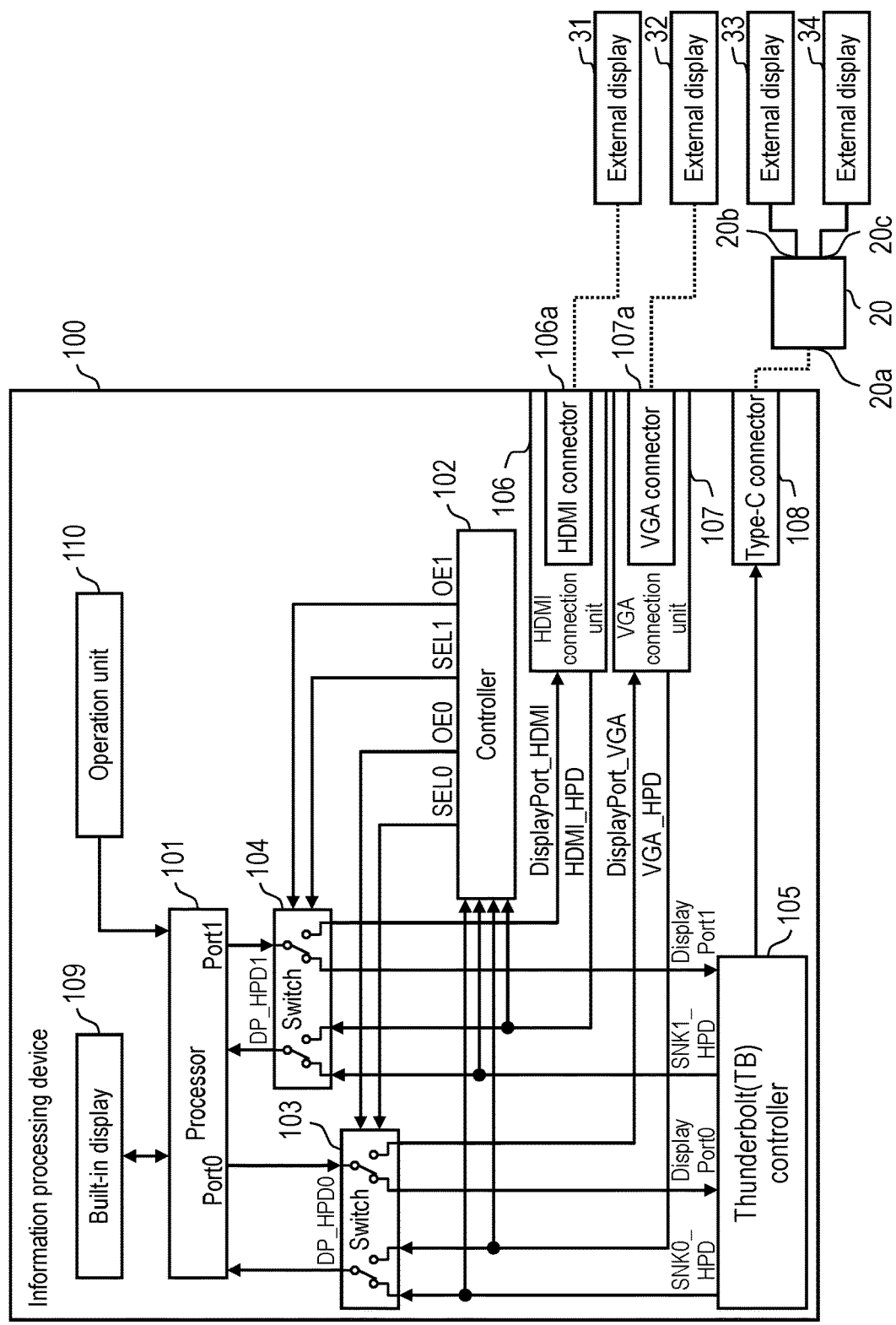
FIG. 2 is a block diagram showing an internal configuration of information processing device 100 relating to display switching of the external display.

FIG. 2 is a block diagram showing an internal configuration of information processing device 100 relating to display switching of the external display. Information processing device 100 includes processor 101. Processor 101 can be implemented by a central processing unit (CPU), MPU, DSP, microcomputer, FPGA, ASIC or the like. Processor 101 implements various functions by reading an OS, application programs, and various data and executing arithmetic processing. Processor 101 includes two output ports Port0, Port1 for outputting video signals conforming to the DP standard.

Information processing device 100 further includes HDMI connection unit 106, VGA connection unit 107, and TB controller 105. Information processing device 100 further includes switch 103 that intervenes between processor 101, TB controller 105, and VGA connection unit 107. Information processing device 100 further includes switch 104 that intervenes between processor 101 and TB controller 105 and HDMI connection unit 106.

HDMI connection unit 106 includes a converter (not shown) that converts a video signal conforming to the DP standard, which is input from Port1 of processor 101 via switch 104, into a video signal conforming to the HDMI standard. HDMI connection unit 106 includes a circuit that detects the connection of external display 31 to HDMI connector 106a and generates an HDMI_HPD signal. Specifically, HDMI connection unit 106 detects a hot plug detection (HPD) signal input from external display 31 and generates an HDMI_HPD signal. In the following, HPD may mean hot plug detection. HDMI connection unit 106 further includes HDMI connector 106a for connecting information processing device 100 to external display 31. HDMI connection unit 106 outputs a video signal conforming to the HDMI standard to external display 31 via HDMI connector 106a.

VGA connection unit 107 includes a converter (not shown) that converts a video signal conforming to the DP standard, which is input from Port0 of processor 101 via switch 103 into a video signal conforming to the VGA standard. VGA connection unit 107 includes a circuit that detects the connection of external display 32 to VGA connector 107a and generates a VGA_HPD signal. VGA connection unit 107 further includes VGA connector 107a for connecting information processing device 100 to external display 32. VGA connection unit 107 outputs a video signal conforming to the VGA standard to external display 32 via VGA connector 107a.

TB controller 105 includes a circuit that detects the connection of external displays 33, 34 to Type-C connector 108 and generates an SNK0_HPD signal and an SNK1_HPD signal. TB controller 105, if necessary, multiplexes a video signal conforming to the DP standard, which is input from Port0 of processor 101 via switch 103, with a video signal conforming to the DP standard, which is input from Port1 of processor 101 via switch 104. TB controller 105 converts the input video signal conforming to the DP standard into a signal conforming to the TB standard. TB controller 105 outputs the converted signal to converter 20 via Type-C connector 108.

Information processing device 100 further includes controller 102 that controls switching of switches 103, 104. Controller 102 can be implemented by a microcomputer, FPGA, ASIC or the like.

As described above, switch 103 intervenes between Port0 of processor 101 and VGA connector 107a, and between Port0 of the processor and Type-C connector 108. Switch 103 is configured to switch a path between switch 103 and VGA connector 107a and a path between switch 103 and Type-C connector 108. Switch 104 intervenes between Port1 of processor 101 and HDMI connector 106a, and between Port1 of processor 101 and Type-C connector 108. Switch 104 is configured to switch a path between switch 104 and HDMI connector 106a and a path between switch 104 and Type-C connector 108.

Various signals will be described below. The SNK0_HPD signal output from TB controller 105 is a signal indicating that one of two external displays 33, 34 is connected to Type-C connector 108 via converter 20. The SNK1_HPD signal is a signal indicating that the other of two external displays 33, 34 is connected to Type-C connector 108 via converter 20.

The SNK0_HPD signal has a voltage of a High level (hereinafter, referred to as an H level) when one of two external displays 33, 34 is connected to Type-C connector 108 via converter 20. When one of two external displays 33, 34 is not connected to Type-C connector 108 via converter 20, the SNK0_HPD signal has a voltage of a Low level (hereinafter, referred to as an L level).

Similarly, the SNK1_HPD signal has a voltage of the H level when the other of two external displays 33, 34 is connected to Type-C connector 108 via converter 20. When the other of two external displays 33, 34 is not connected to Type-C connector 108 via converter 20, the SNK1_HPD signal has a voltage of the L level.

The HDMI_HPD signal output from HDMI connection unit 106 is a signal indicating that external display 31 is connected to HDMI connector 106a. The VGA_HPD signal is a signal indicating that external display 32 is connected to VGA connector 107a.

The HDMI_HPD signal is at the H level when external display 31 is connected to HDMI connector 106a. On the other hand, when external display 31 is not connected to HDMI connector 106a, the HDMI_HPD signal is at the L level.

Similarly, the VGA_HPD signal is at the H level when external display 32 is connected to VGA connector 107a. On the other hand, when external display 32 is not connected to VGA connector 107a, the VGA_HPD signal is at the L level.

The SNK0_HPD signal from TB controller 105 and the VGA_HPD signal from the VGA connection unit are input to controller 102 and switch 103. The SNK1_HPD signal from TB controller 105 and the HDMI_HPD signal from the HDMI connection unit are input to controller 102 and switch 104.

Switch 103 selectively outputs the SNK0_HPD signal from TB controller 105 or the VGA_HPD signal from VGA connection unit 107 to processor 101 as a DP_HDP0 signal. Switch 104 selectively outputs the SNK1_HPD signal from TB controller 105 or the HDMI_HPD signal from HDMI connection unit 106 to processor 101 as a DP_HDP1 signal.

Controller 102 controls switching of switches 103, 104 to select a connector that outputs a video signal. The user can freely set the priority of the connector that outputs the video signal. A method of setting the priority will be described later.

Controller 102 determines whether or not an external display is connected to each interface connector 106a, 107a, 108 by detecting the signal levels of the input HDMI_HPD signal, VGA_HPD signal, SNK0_HPD signal, and SNK1_HPD signal.

Controller 102 outputs an SEL0 signal and an OE0 signal to switch 103 in order to select the connector that outputs the video signal. Similarly, controller 102 outputs an SEL1 signal and an OE1 signal to switch 104 in order to select the connector that outputs the video signal.

Here, the OE0 signal is a signal that enables or disables the output of switch 103. Switch 103 is enabled when the OE0 signal is at the H level. When switch 103 is enabled, switch 103 selectively outputs the input SNK0_HPD signal or VGA_HPD signal as the DP_HDP0 signal. When the OE0 signal is at the L level, switch 103 is disabled. When switch 103 is disabled, the DP_HDP0 signal is at the L level.

The SEL0 signal is a signal for switching switch 103. When the OE0 signal is at the H level and the SEL0 signal is at the L level, switch 103 selects the SNK0_HPD signal and outputs it as the DP_HDP0 signal. On the other hand, when the OE0 signal and the SEL0 signal are at the H level, switch 103 selects the VGA_HPD signal and outputs it as the DP_HDP0 signal.

Further, when the OE0 signal is at the H level and the SEL0 signal is at the L level, the signal from Port0 of processor 101 is input to TB controller 105 as the DisplayPort0 signal via switch 103. On the other hand, when the OE0 signal and the SEL0 signal are at the H level, the signal from Port0 is input to VGA connection unit 107 via switch 103 as the DisplayPort_VGA signal.

At this time, when the DP_HDP0 signal is at the H level, the signal from Port0 has a video signal conforming to the DP standard. On the other hand, when the DP_HDP0 signal is at the L level, the signal from Port0 is at the L level. When the DP_HDP0 signal changes from the L level to the H level, processor 101 performs LinkTraining with the external display of the connection destination. Here, LinkTraining refers to a mechanism in which signals are mutually transmitted and received between processor 101 and the external display to adjust a transfer speed, Skew timing, and the like. After completing LinkTraining, processor 101 transmits a video signal to the external display of the connection destination.

Similarly, the OE1 signal is a signal that enables or disables the output of switch 104. Switch 104 is enabled when the OE1 signal is at the H level. When switch 104 is enabled, switch 104 selectively outputs the input SNK1_HPD signal or HDMI_HPD signal as the DP_HDP1 signal. When the OE1 signal is at the L level, switch 104 is disabled. When switch 104 is disabled, the DP_HDP1 signal is at the L level.

The SEL1 signal is a signal for switching switch 104. When the OE1 signal is at the H level and the SEL1 signal is at the L level, switch 104 selects the SNK1_HPD signal and outputs it as the DP_HDP1 signal. On the other hand, when the SEL1 signal and the OE1 signal are at the H level, switch 104 selects the HDMI_HPD signal and outputs it as the DP_HDP1 signal.

Furthermore, when the OE1 signal is at the H level and the SEL1 signal is at the L level, the signal from Port1 of processor 101 is input to TB controller 105 via switch 104 as a DisplayPort1 signal. On the other hand, when the OE1 signal and the SEL1 signal are at the H level, the signal from Port1 is input to HDMI connection unit 106 as a DisplayPort_HDMI signal via switch 104.

At this time, when the DP_HDP1 signal is at the H level, the signal from Port1 has a video signal conforming to the DP standard. On the other hand, when the DP_HDP1 signal is at the L level, the signal from Port1 is at the L level. When the DP_HDP1 signal changes from the L level to the H level, processor 101 performs LinkTraining with the external display of the connection destination. After completing LinkTraining, processor 101 transmits a video signal to the external display of the connection destination.

Information processing device 100 further includes operation unit 110. Operation unit 110 includes a keyboard, a mouse, a touch panel or the like that is stacked on built-in display 109 and can receive a user's touch operation.

Figure 3:
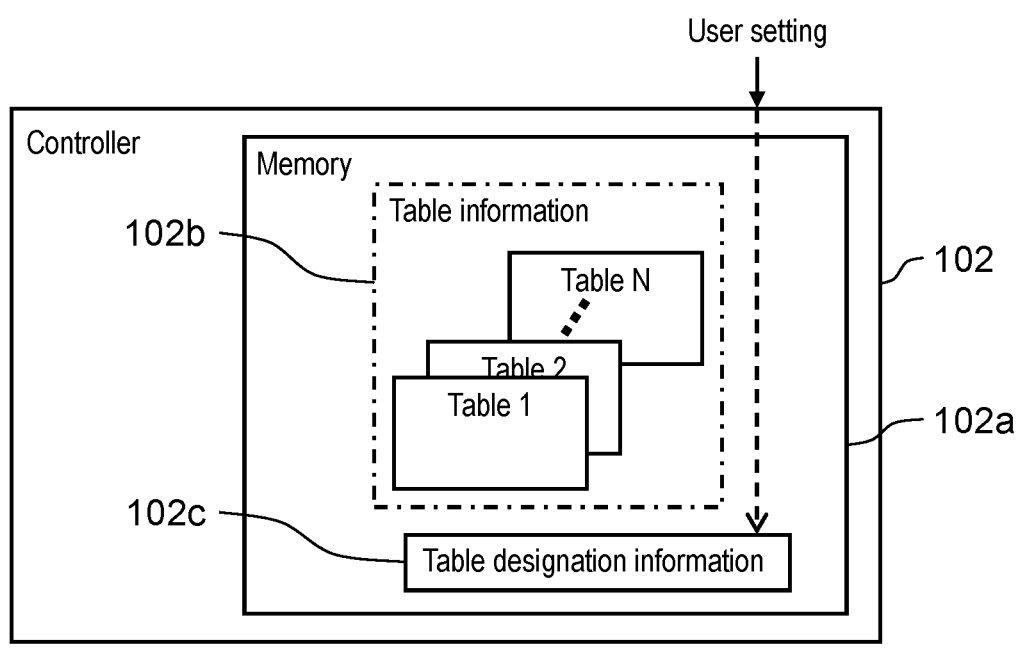
FIG. 3 is a diagram illustrating an internal configuration of controller 102 having information for setting a priority of an interface connector that outputs a video signal.

Controller 102 of information processing device 100 determines to which of interface connectors 106a, 107a, 108 the video signal is output when a plurality of displays are connected to interface connectors 106a, 107a, 108. Memory 102a of controller 102 stores table information 102b and table designation information 102c as shown in FIG. 3. Controller 102 uses table information 102b to determine the connector that outputs a video signal. Table information 102b has a plurality of (N) tables. Information for determining a connector that outputs a video signal is set in each table. That is, each table defines the relationship between the connection states of interface connectors 106a, 107a, 108 and at least one connector that outputs a video signal among interface connectors 106a, 107a, 108.

Which of the plurality of tables is selected is determined based on table designation information 102c. Table designation information 102c can be freely set by the user via operation unit 110. In the present embodiment, table information 102b and table designation information 102c stored in memory 102a are examples of setting information.

FIG. 4 is a diagram illustrating a table included in the table information. Table 1 is a table that gives priority to the output of a video signal to HDMI connector 106a when external display 31 is connected to HDMI connector 106a. Table 2 is a table that gives priority to the output of a video signal to Type-C connector 108 when external displays 33, 34 are connected to Type-C connector 108.

In a "connection state" column of each table, "○" indicates that each connector is connected to the external display. "-" Indicates that each connector and the external display are not connected.

Further, in a "video output" column, "two screens" indicates that information processing device 100 outputs a video signal to two external displays 33, 34 via Type-C connector 108. "One screen" indicates that information processing device 100 outputs a video signal to only one of two external displays 33, 34 via Type-C connector 108. "○" indicates that information processing device 100 outputs a video signal to the corresponding external display. "x" indicates that each connector is connected to the external display, but information processing device 100 does not output a video signal to the external display. "-" indicates that each connector is not connected to the external display, and thus information processing device 100 does not output a video signal to the corresponding connector.

The "TB mode" is a mode in which information processing device 100 gives priority to the output of a video signal from Type-C connector 108 to two external displays 33, 34. The "HDMI mode" is a mode in which information processing device 100 gives priority to the output of a video signal from HDMI connector 106a. The "VGA mode" is a mode in which information processing device 100 gives priority to the output of a video signal from VGA connector 107a.

When table designation information 102c designates table 1, controller 102 of information processing device 100 operates such that HDMI connector 106a, Type-C connector 108, and VGA connector 107a have lower priorities in this order. That is, controller 102 controls switches 103, 104 such that HDMI connector 106a has the highest priority and VGA connector 107a has the lowest priority.

Connection state No. 1 shows a state in which controller 102 detects the connection of two external displays 33, 34 to Type-C connector 108. At this time, controller 102 has not detected the connection of external display 31 to HDMI connector 106a. Furthermore, controller 102 has not detected the connection of external display 32 to VGA connector 107a. Controller 102 switches switches 103, 104 so as to output the video signal to two external displays 33, 34.

Connection state No. 2 shows a state in which controller 102 detects the connection of two external displays 33, 34 to Type-C connector 108 and the connection of external display 31 to HDMI connector 106a. At this time, controller 102 has not detected the connection of external display 32 to VGA connector 107a. Controller 102 operates to give priority to the output of the video signal to external display 31. Therefore, controller 102 switches switch 104 so as to output the video signal to external display 31. Further, controller 102 switches switch 103 so as to output the video signal to one of two external displays 33, 34.

Connection state No. 3 shows a state in which controller 102 detects the connection of two external displays 33, 34 to Type-C connector 108, the connection of external display 31 to HDMI connector 106a, and the connection of external display 32 to VGA connector 107a. Controller 102 gives priority to the output of the video signal to external display 31. Therefore, controller 102 switches switch 104 so as to output the video signal to external display 31. Further, controller 102 switches switch 103 so as to output the video signal to one of two external displays 33, 34.

Connection state No. 4 shows a state in which controller 102 detects the connection of two external displays 33, 34 to Type-C connector 108 and the connection of external display 32 to VGA connector 107a. At this time, controller 102 has not detected the connection of external display 31 to HDMI connector 106a. Controller 102 gives priority to the output of the video signal to two external displays 33, 34 connected to Type-C connector 108, which has the second highest priority after HDMI connector 106a. Therefore, controller 102 switches switches 103, 104 so as to output the video signal to two external displays 33, 34.

Connection state No. 5 shows a state in which controller 102 detects the connection of external display 31 to HDMI connector 106a and the connection of external display 32 to VGA connector 107a. At this time, controller 102 has not detected the connection of the external display to Type-C connector 108. Controller 102 switches switches 103, 104 so as to output the video signal to external display 31 and external display 32.

When table designation information 102c designates table 2, controller 102 of information processing device 100 operates such that the priority becomes lower in the order of Type-C connector 108, HDMI connector 106a, and VGA connector 107a. That is, controller 102 controls switches 103, 104 such that Type-C connector 108 has the highest priority and VGA connector 107a has the lowest priority.

Connection state No. 1 shows a state in which controller 102 detects the connection of two external displays 33, 34 to Type-C connector 108. At this time, controller 102 has not detected the connection of the external display to HDMI connector 106a and VGA connector 107a. Controller 102 switches switches 103, 104 so as to output the video signal to two external displays 33, 34.

Connection state No. 2 shows a state in which controller 102 detects the connection of two external displays 33, 34 to Type-C connector 108 and the connection of external display 31 to HDMI connector 106a. At this time, controller 102 has not detected the connection of external display 32 to VGA connector 107a. Controller 102 operates to give priority to the output of the video signal to two external displays 33, 34 connected to Type-C connector 108. Therefore, controller 102 switches switches 103, 104 so as to output the video signal to two external displays 33, 34.

Connection state No. 3 shows a state in which controller 102 detects the connection of two external displays 33, 34 to Type-C connector 108, the connection of external display 31 to HDMI connector 106a, and the connection of external display 32 to VGA connector 107a. Controller 102 operates to give priority to the output of the video signal to two external displays 33, 34 connected to Type-C connector 108. Therefore, controller 102 switches switches 103, 104 so as to output the video signal to two external displays 33, 34.

Connection state No. 4 shows a state in which controller 102 detects the connection of two external displays 33, 34 to Type-C connector 108 and the connection of external display 32 to VGA connector 107a. At this time, controller 102 has not detected the connection of the external display to HDMI connector 106a. Controller 102 operates to give priority to the output of the video signal to two external displays 33, 34 connected to Type-C connector 108. Therefore, controller 102 switches switches 103, 104 so as to output the video signal to two external displays 33, 34.

Connection state No. 5 shows a state in which controller 102 detects the connection of external display 31 to HDMI connector 106a and the connection of external display 32 to VGA connector 107a. At this time, controller 102 has not detected the connection of the external display to Type-C connector 108. Controller 102 switches switches 103, 104 so as to output the video signal to external displays 31, 32.

Although not shown in the figure, information processing device 100 further includes, in addition to the configuration shown in FIG. 2, a volatile storage device (RAM), a non-volatile storage device (ROM, SSD, etc.), a battery, and the like in order to implement a normal function as a computer.

1-2. Operation

The switching control of the output destination of the video signal in information processing device 100 configured as above will be described.

Figure 5:
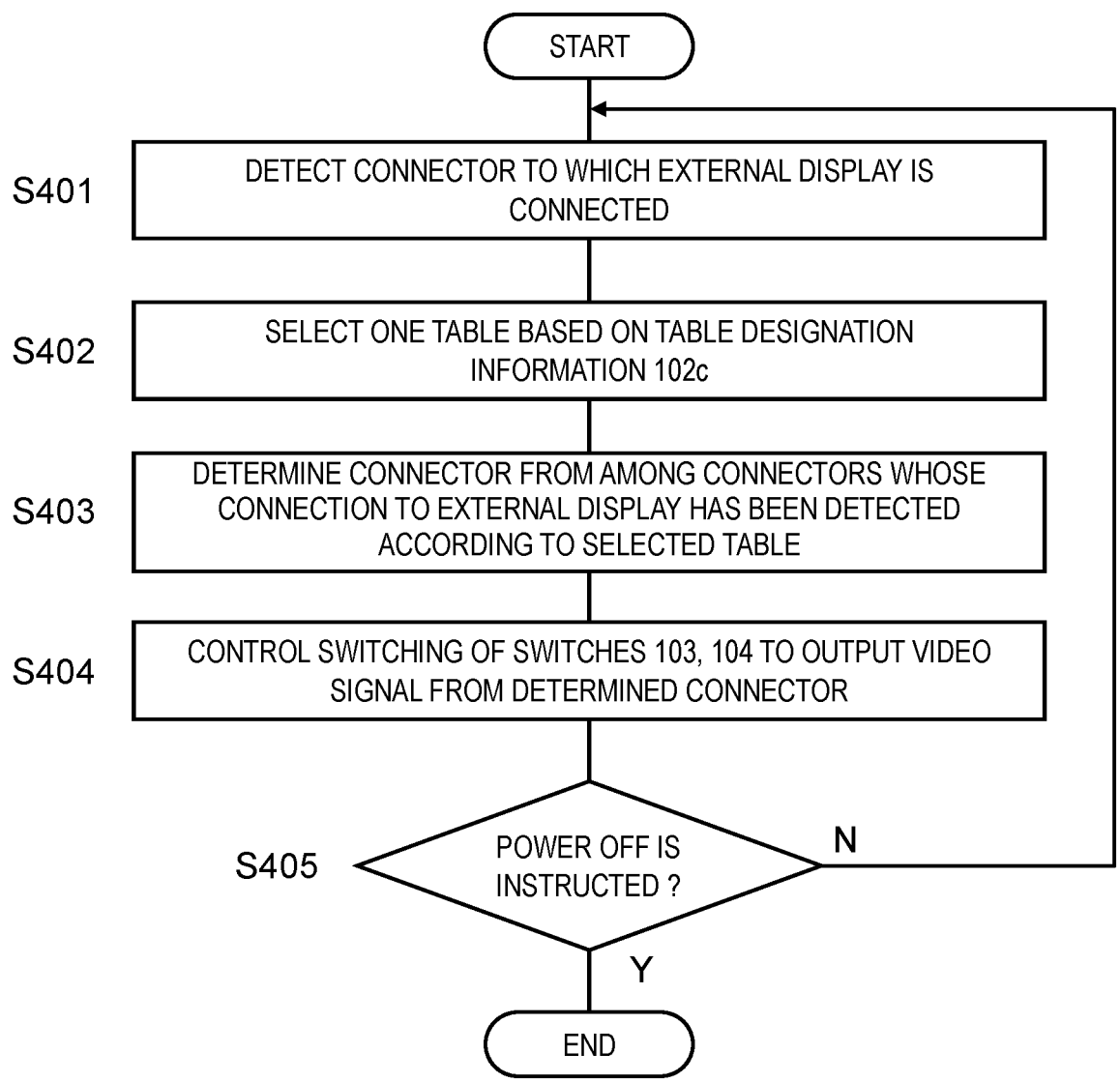
FIG. 5 is a flowchart showing switching control of switches 103, 104 in FIG. 2.

FIG. 5 is a flowchart showing a switching control of switches 103, 104 by controller 102. When the user turns on power of information processing device 100, controller 102 detects a connector to which the external display is connected (S401).

Next, controller 102 selects one of the plurality of tables in table information 102b based on table designation information 102c (S402). Each table defines the priority of the connector that outputs a video signal. As described above, table designation information 102c is input in advance by the user.

After that, controller 102 refers to the selected table and determines the connector that outputs the video signal from among the connectors whose connection to the external display has been detected (S403).

Controller 102 controls switching of switches 103, 104 in order to output the video signals output from Port0 and Port1 of processor 101 from the determined connector (S404).

Controller 102 repeats the above processing until the user gives an instruction to turn off power of information processing device 100. That is, when controller 102 does not detect the power-off instruction (NO in S405), controller 102 performs processing of step S401 again. When controller 102 detects the power-off instruction (YES in S405), this processing ends.

Figure 6:
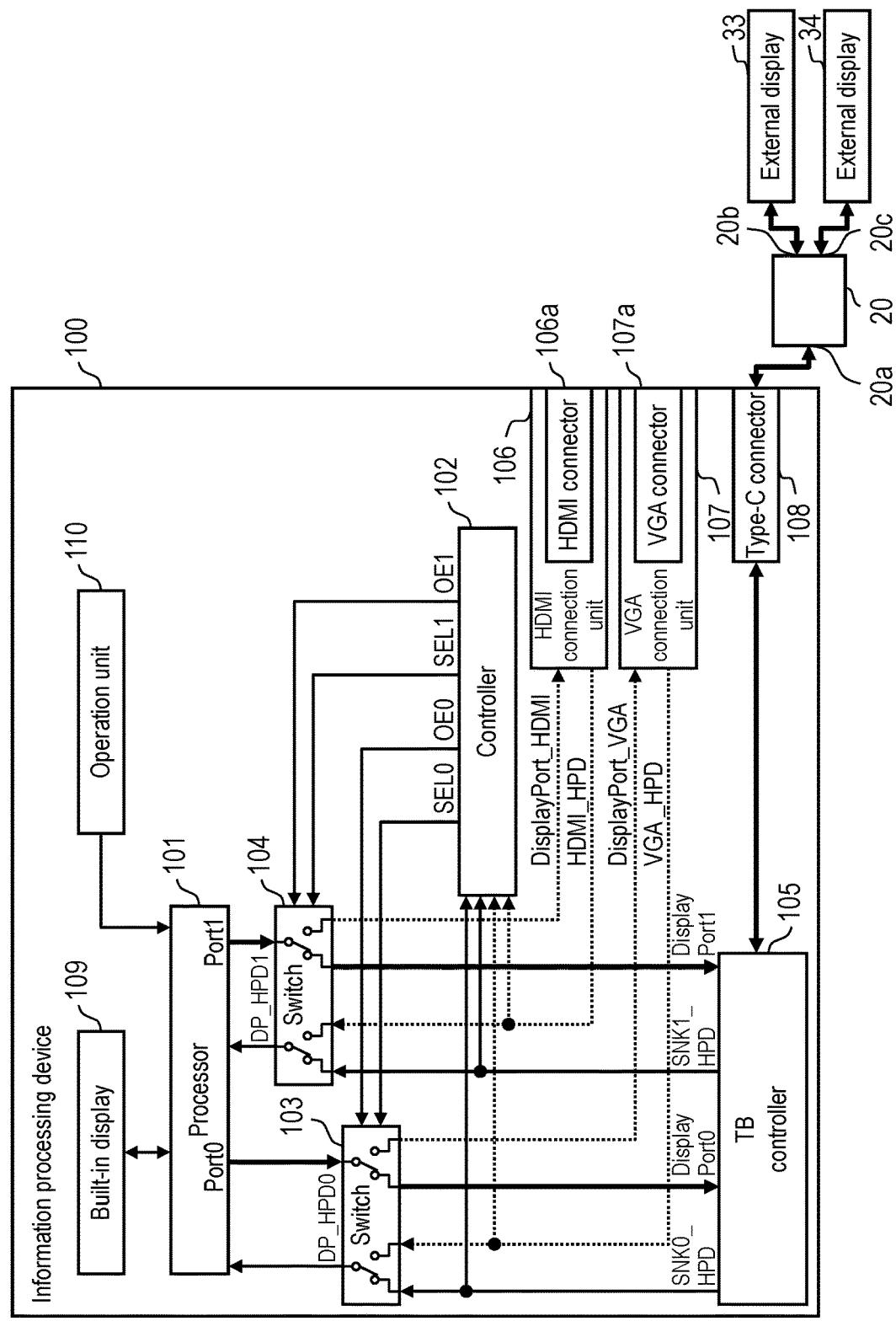
FIG. 6 is a diagram showing connection states and signal flows when table 1 in FIG. 4 is designated and external displays 33, 34 are connected.

Hereinafter, a specific example of a display switching operation of information processing device 100 will be described. FIG. 6 is a diagram showing a connection state and signal flows when table 1 in FIG. 4 is designated by table designation information 102c and external displays 33, 34 are connected to Type-C connector 108. At this time, no external display is connected to HDMI connector 106a and VGA connector 107a. This connection state corresponds to connection state No. 1 in table 1.

Since two external displays 33, 34 are connected to Type-C connector 108, the SNK0_HPD signal and the SNK1_HPD signal are at the H level. Since no external display is connected to HDMI connector 106a, the HDMI_HPD signal is at the L level. Since no external display is connected to VGA connector 107a, the VGA_HPD signal is at the L level.

Since the SNK0_HPD signal and the SNK1_HPD signal are at the H level, controller 102 detects the state in which two external displays 33, 34 are connected to Type-C connector 108. At this time, since the HDMI_HPD signal is at the L level, controller 102 has not detected that an external display is connected to HDMI connector 106a. Moreover, since the VGA_HPD signal is at the L level, controller 102 has not detected that an external display is connected to VGA connector 107a.

Controller 102 sets the video output mode to the TB mode according to connection state No. 1 in table 1. That is, controller 102 sets switch 103 so as to output the video signal to one of two external displays 33, 34. That is, the OE0 signal is at the H level and the SEL0 signal is at the L level.

Further, controller 102 sets switch 104 so as to output the video signal to the other of two external displays 33, 34. That is, the OE1 signal is at the H level and the SEL1 signal is at the L level.

Processor 101 outputs the DisplayPort0 signal having a video signal conforming to the DP standard to TB controller 105 from Port0 via switch 103. TB controller 105 converts the video signal conforming to the DP standard into a signal conforming to the TB standard. TB controller 105 outputs the signal conforming to the TB standard to converter 20 via Type-C connector 108. Converter 20 converts the signal conforming to the TB standard into a video signal conforming to the DP standard. Converter 20 outputs the video signal conforming to the DP standard to one of two external displays 33, 34.

Further, processor 101 outputs a DisplayPort1 signal having a video signal conforming to the DP standard to TB controller 105 from Port1 via switch 104. TB controller 105 converts the video signal conforming to the DP standard into a signal conforming to the TB standard. TB controller 105 outputs the signal conforming to the TB standard to converter 20 via Type-C connector 108. Converter 20 converts the signal conforming to the TB standard into a video signal conforming to the DP standard. Converter 20 outputs the video signal conforming to the DP standard to the other of two external displays 33, 34.

Figure 7:
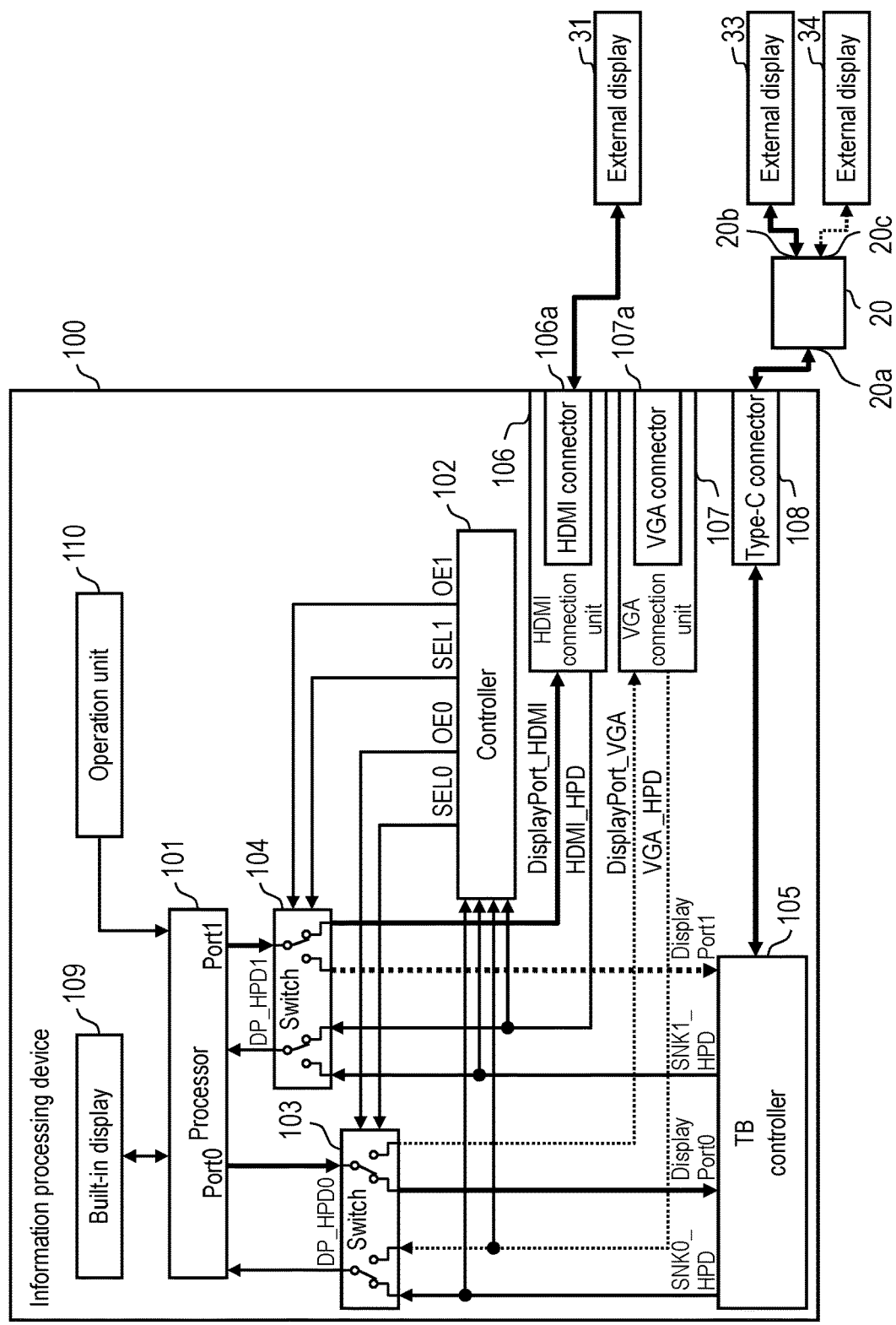
FIG. 7 is a diagram showing connection states and signal flows when table 1 in FIG. 4 is designated and external displays 31, 33, 34 are connected.

FIG. 7 is a diagram showing a connection state and signal flows when external display 31 is further connected to HDMI connector 106a from the state shown in FIG. 6. This connection state corresponds to connection state No. 2 in table 1.

Since two external displays 33, 34 are connected to Type-C connector 108, the SNK0_HPD signal is at the H level. Similarly, the SNK1_HPD signal is at the H level. Since external display 31 is connected to HDMI connector 106a, the HDMI_HPD signal is at the H level. Note that, since no external display is connected to VGA connector 107a, the VGA_HPD signal is at the L level.

Since the SNK0_HPD signal and the SNK1_HPD signal are at the H level, controller 102 detects the state in which two external displays 33, 34 are connected to Type-C connector 108. Furthermore, since the HDMI_HPD signal is at the H level, controller 102 detects the state in which external display 31 is connected to HDMI connector 106a. At this time, since the VGA_HPD signal is at the L level, controller 102 does not detect that an external display is connected to VGA connector 107a.

Controller 102 sets the video output mode to the HDMI mode according to connection state No. 2 in table 1. That is, controller 102 sets switch 103 so as to output a video signal to one of two external displays 33, 34 via Type-C connector 108. That is, the OE0 signal is at the H level and the SEL0 signal is at the L level.

Controller 102 also sets switch 104 so as to output a video signal to external display 31 via HDMI connector 106a. That is, the OE1 signal is at the H level and the SEL1 signal is at the H level.

Processor 101 outputs the DisplayPort0 signal having a video signal conforming to the DP standard to TB controller 105 from Port0 via switch 103. TB controller 105 converts the video signal conforming to the DP standard into a signal conforming to the TB standard. TB controller 105 outputs the signal conforming to the TB standard to converter 20. Converter 20 converts the signal conforming to the TB standard into a video signal conforming to the DP standard.

Converter 20 outputs the video signal conforming to the DP standard to one of two external displays 33, 34 (external display 33 in FIG. 7).

Further, processor 101 outputs the DisplayPort_HDMI signal having a video signal conforming to the DP standard to HDMI connection unit 106 from Port1 via switch 104. HDMI connection unit 106 converts the video signal conforming to the DP standard into a signal conforming to the HDMI standard. HDMI connection unit 106 outputs the signal conforming to the HDMI standard to external display 31.

At this time, since switch 104 is set so as to output the video signal from Port1 to HDMI connection unit 106, the DisplayPort1 signal does not have the video signal from Port1. Therefore, the video signal is not output to the other of two external displays 33, 34 (external display 34 in FIG. 7).

Figure 8:
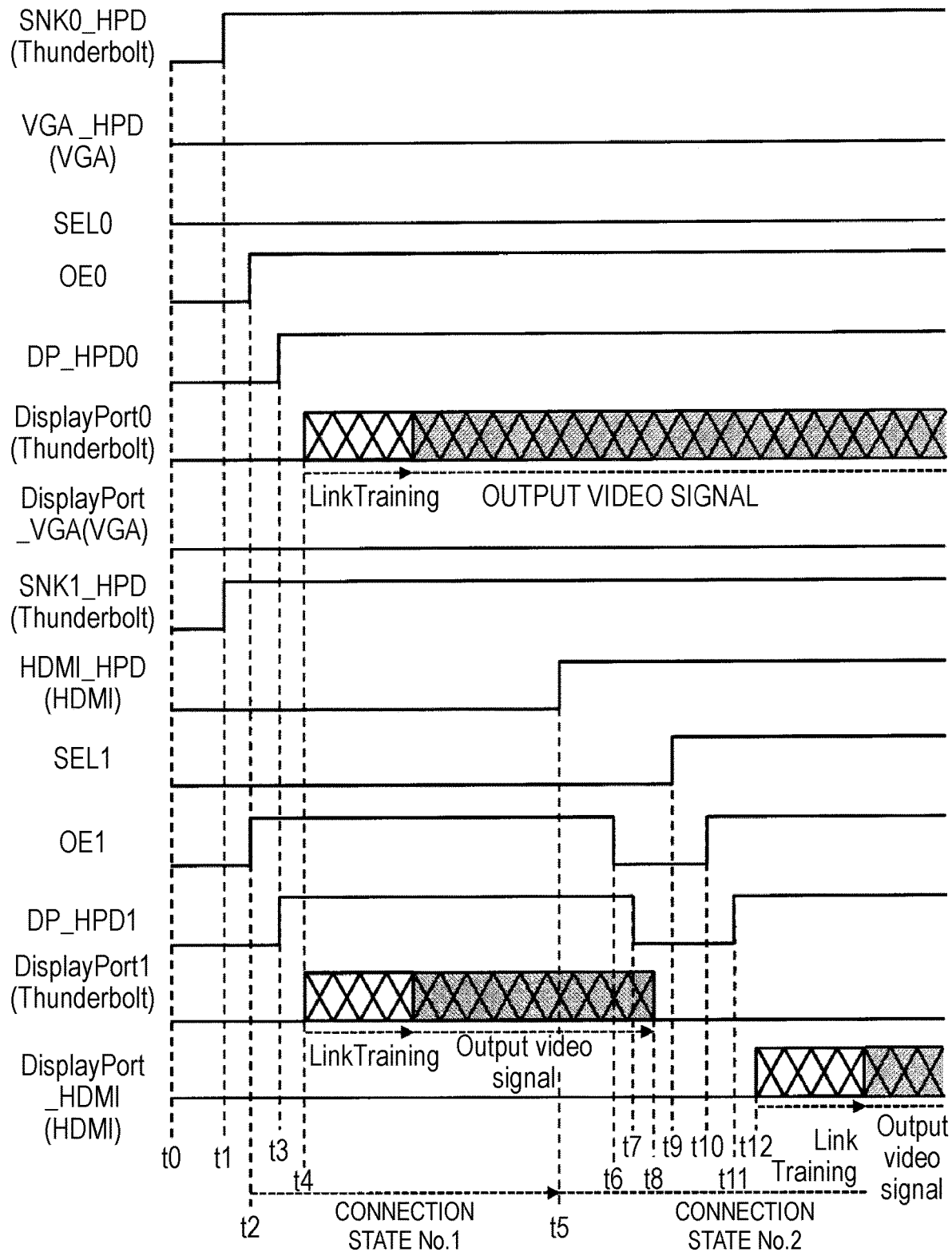
FIG. 8 is a timing chart showing a state in which no external display is connected, external displays 33, 34 are connected, and then external display 31 is connected.

FIG. 8 shows a timing chart in which external displays 33, 34 are connected to Type-C connector 108 as shown in FIG. 6 from the state in which no external display is connected to information processing device 100, and thereafter, as shown in FIG. 7, external display 31 is connected to HDMI connector 106a. In the example of FIG. 8, table 1 is designated. Hereinafter, the timing chart will be described in detail.

At time t0, information processing device 100 is not connected to any external display. Therefore, the HDMI_HPD signal, VGA_HPD signal, SNK0_HPD signal, and SNK1_HPD signal are at the L level.

Since the SNK0_HPD signal and the VGA_HPD signal are at the L level, controller 102 sets the OE0 signal to the L level to disable the output of switch 103. Since switch 103 is disabled, the DP_HDP0 signal is at the L level. Controller 102 also sets the SEL0 signal to the L level.

Similarly, since the SNK1_HPD signal and the HDMI_HPD signal are at the L level, controller 102 sets the OE1 signal to the L level to disable the output of switch 104. Since switch 104 is disabled, the DP_HDP1 signal is at the L level. Further, controller 102 sets the SEL1 signal to the L level.

At time t1, as shown in FIG. 6, when converter 20 to which external displays 33, 34 are connected is connected to Type-C connector 108, TB controller 105 sets the SNK0_HPD signal to the H level and sets the SNK1_HPD signal to the H level.

When the SNK0_HPD signal and the SNK1_HPD signal become the H level, controller 102 sets the video output mode to the TB mode according to connection state No. 1 in table 1. That is, controller 102 sets switches 103, 104 so as to output the video signal to external displays 33, 34 via Type-C connector 108.

That is, controller 102 sets the OE0 signal to the H level and enables the output of switch 103 at time t2 delayed from time t1. At this time, controller 102 maintains the SEL0 signal at the L level. At the same time, controller 102 sets the OE1 signal to the H level to enable the output of switch 104. At this time, controller 102 maintains the SEL1 signal at the L level.

After that, switch 103 receives the SNK0_HPD signal of the H level and sets the DP_HDP0 signal to the H level (time t3). At the same time, switch 104 receives the SNK1_HPD signal of the H level and sets the DP_HDP1 signal to the H-level.

When the DP_HDP0 signal changes from the L level to the H level, processor 101 starts LinkTraining for external display 33 which is one of two external displays 33, 34 (time t4). After completing LinkTraining, processor 101 starts outputting the video signal (DisplayPort0). As a result, an image is displayed on external display 33 connected via Type-C connector 108 and converter 20.

At the same time, when the DP_HDP1 signal changes from the L level to the H level, processor 101 starts LinkTraining for external display 34 which is the other of two external displays 33, 34. After completing LinkTraining, processor 101 starts outputting the video signal (DisplayPort1). As a result, an image is displayed on external display 34 connected via Type-C connector 108 and converter 20.

Thereafter, at time t5, as shown in FIG. 7, when external display 31 is connected to HDMI connector 106a, the HDMI_HPD signal becomes H level.

When the HDMI_HPD signal becomes the H level, controller 102 switches the video output mode from the TB mode to the HDMI mode according to connection state No. 2 in table 1. Then, controller 102 sets switch 104 so as to output the video signal to HDMI connector 106a.

When the HDMI_HPD signal becomes H level at time t5, controller 102 sets the OE1 signal to the L level at time t6 delayed from time t5. When the OE1 signal becomes the L level, switch 104 sets the DP_HDP1 signal to the L level at time t7 slightly delayed from time t6. When the DP_HDP1 signal becomes the L level, controller 102 stops the output of the video signal to the other of two external displays 33, 34 (that is, external display 34) (time t8).

After that, at time t9, controller 102 sets the SEL1 signal to the H level and switches the signal output as the DP_HDP1 signal from the SNK1_HPD signal to the HDMI_HPD signal. After that, at time t10, the OE1 signal becomes H level. At time t11 further slightly delayed from time t10, switch 104 receives the HDMI_HPD signal of the H level and sets the DP_HDP1 signal to the H level. When the DP_HDP1 signal changes from the L level to the H level, processor 101 starts LinkTraining with external display 31 (time t12). After completing LinkTraining, processor 101 starts outputting a video signal (DisplayPort_HDMI signal) to HDMI connection unit 106. As a result, an image is displayed on external display 31 connected to HDMI connector 106a.

Here, the reason why the OE1 signal is set to the L level to disable switch 104 from time t6 to time t10 will be described. At time t9, the SNK1_HPD signal and the HDMI_HPD signal are both at the H level. Therefore, the DP_HDP1 signal remains at the H level and does not change no matter which side switch 104 is switched to while maintaining the OE1 signal at the H level. Therefore, processor 101 cannot detect that switch 104 has been switched. Therefore, the DP_HDP1 signal is set to the L level from time t7 to time t11 by setting the OE1 signal to the L level to disable switch 104 from time t6 to time t10. As a result, processor 101 can detect that switch 104 has been switched.

As described above, controller 102 detects whether or not an external display is connected to interface connector 106a, 107a, 108. Then, controller 102 determines a connector that outputs a video signal based on the connection state of the external display and table information 102b.

Figure 9:
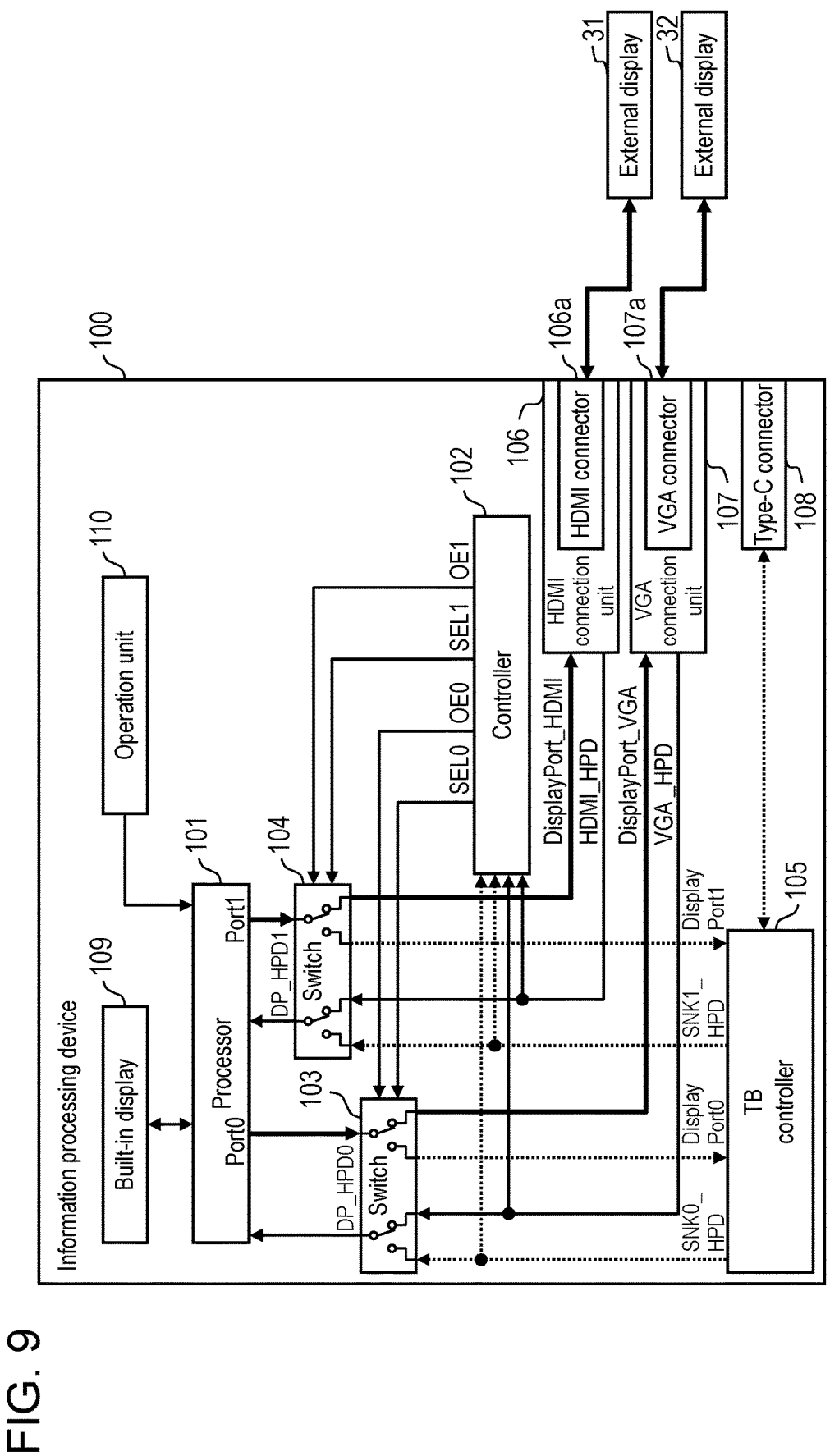
FIG. 9 is a diagram showing connection states and signal flows when table 1 in FIG. 4 is designated and external displays 31, 32 are connected.

FIG. 9 shows a connection state and signal flows when table 1 is designated as a table to be used, external display 31 is connected to HDMI connector 106a, and external display 32 is connected to VGA connector 107a. At this time, no external display is connected to Type-C connector 108. This connection state corresponds to connection state No. 5 in table 1, and the VGA mode is set as the video output mode.

Since external display 31 is connected to HDMI connector 106a, the HDMI_HPD signal is at the H level. Since external display 32 is connected to VGA connector 107a, the VGA_HPD signal is at the H level. Since no external display is connected to Type-C connector 108, the SNK0_HPD signal and the SNK1_HPD signal are at the L level.

Since the HDMI_HPD signal is at the H level, controller 102 detects the state in which external display 31 is connected to HDMI connector 106a. Further, since the VGA_HPD signal is at the H level, controller 102 detects the state in which external display 32 is connected to VGA connector 107a. At this time, since the SNK0_HPD signal and the SNK1_HPD signal are at the L level, controller 102 has not detected that an external display is connected to Type-C connector 108.

Controller 102 sets switch 103 so as to output a video signal to external display 32 via VGA connector 107a according to connection state No. 5 in table 1. That is, the OE0 signal is at the H level and the SEL0 signal is at the H level.

Further, controller 102 sets switch 104 so as to output a video signal to external display 31 via HDMI connector 106a according to connection state No. 5 in table 1. That is, the OE1 signal is at the H level and the SEL1 signal is at the H level.

Processor 101 outputs a video signal (DisplayPort_VGA) conforming to the DP standard to VGA connection unit 107 from Port0 via switch 103. VGA connection unit 107 converts the video signal conforming to the DP standard into a video signal conforming to the VGA standard. As a result, an image is displayed on external display 32 connected to VGA connector 107a.

Further, processor 101 outputs a video signal (DisplayPort_HDMI) conforming to the DP standard to HDMI connection unit 106 from Port1 via switch 104. HDMI connection unit 106 converts the video signal conforming to the DP standard into a signal conforming to the HDMI standard. As a result, an image is displayed on external display 31 connected to HDMI connector 106a.

Figure 10:
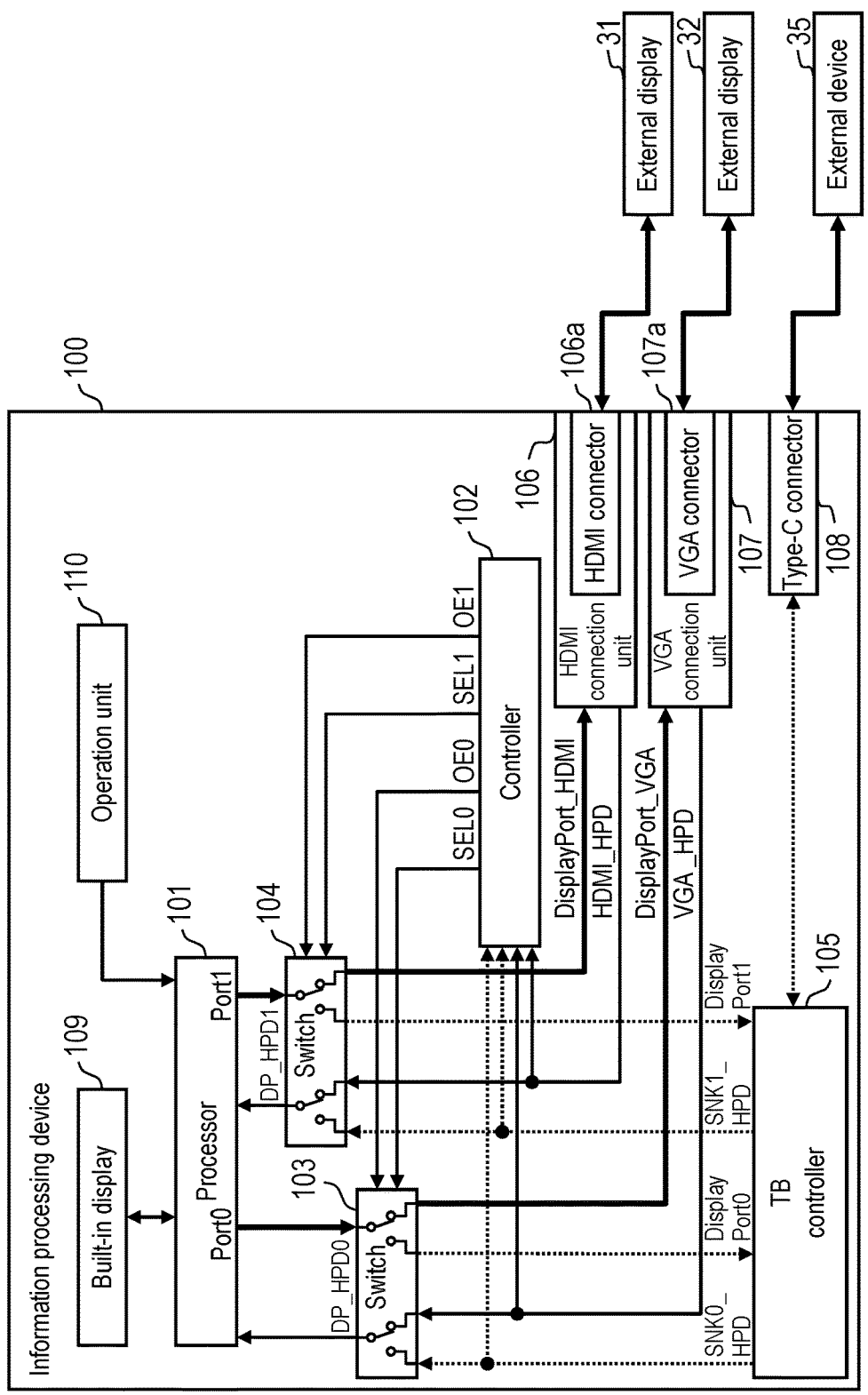
FIG. 10 is a diagram showing connection states and signal flows when table 1 in FIG. 4 is designated and external displays 31, 32 and external device 35 are connected.

FIG. 10 shows a connection state and signal flows when table 1 is designated as a table to be used, external display 31 is connected to HDMI connector 106a, and external display 32 is connected to VGA connector 107a. Here, external device 35 is connected to Type-C connector 108 as an example of a device having no video output function. External device 35 is, for example, a hard disk drive.

Since external display 31 is connected to HDMI connector 106a, the HDMI_HPD signal is at the H level. Since external display 32 is connected to VGA connector 107a, the VGA_HPD signal is at the H level. Here, external device 35 connected to Type-C connector 108 does not have a video output function. Therefore, the SNK0_HPD signal and the SNK1_HPD signal are at the L level. That is, this connection state corresponds to connection state No. 5 in table 1, and the VGA mode is set as the video output mode.

Controller 102 sets switches 103, 104 according to connection state No. 5 in table 1. At this time, processor 101 outputs a video signal (DisplayPort_VGA) conforming to the DP standard from Port0 to VGA connection unit 107 via switch 103. At the same time, processor 101 outputs a video signal (DisplayPort_HDMI) conforming to the DP standard to HDMI connection unit 106 from Port1 via switch 104. As a result, images are displayed on external displays 31, 32 connected to HDMI connector 106a and VGA connector 107a, respectively. However, no image is displayed on external device 35 connected to Type-C connector 108.

1-3. Effect

As described above, memory 102a (see FIG. 3) includes table information 102b having a plurality of (N) tables that define priorities of the connectors for outputting video signals. Memory 102a further includes table designation information 102c that designates one of the plurality of (N) tables included in table information 102b. Controller 102 sets a connector that outputs a video signal according to the table designated by table designation information 102c.

With the above configuration, the user can freely set the priority of the connector that outputs the video signal.

Other Exemplary Embodiments

The first exemplary embodiment has been described above as an example of the technique disclosed in the present application. However, the technique according to the present disclosure is not limited to the above exemplary embodiment, but is applicable to other exemplary embodiments including appropriate modifications, replacements, additions, omissions, and the like. In addition, new exemplary embodiments can be made by combining constituent elements described in the first exemplary embodiment. Accordingly, other exemplary embodiments will be described below.

Figure 11:
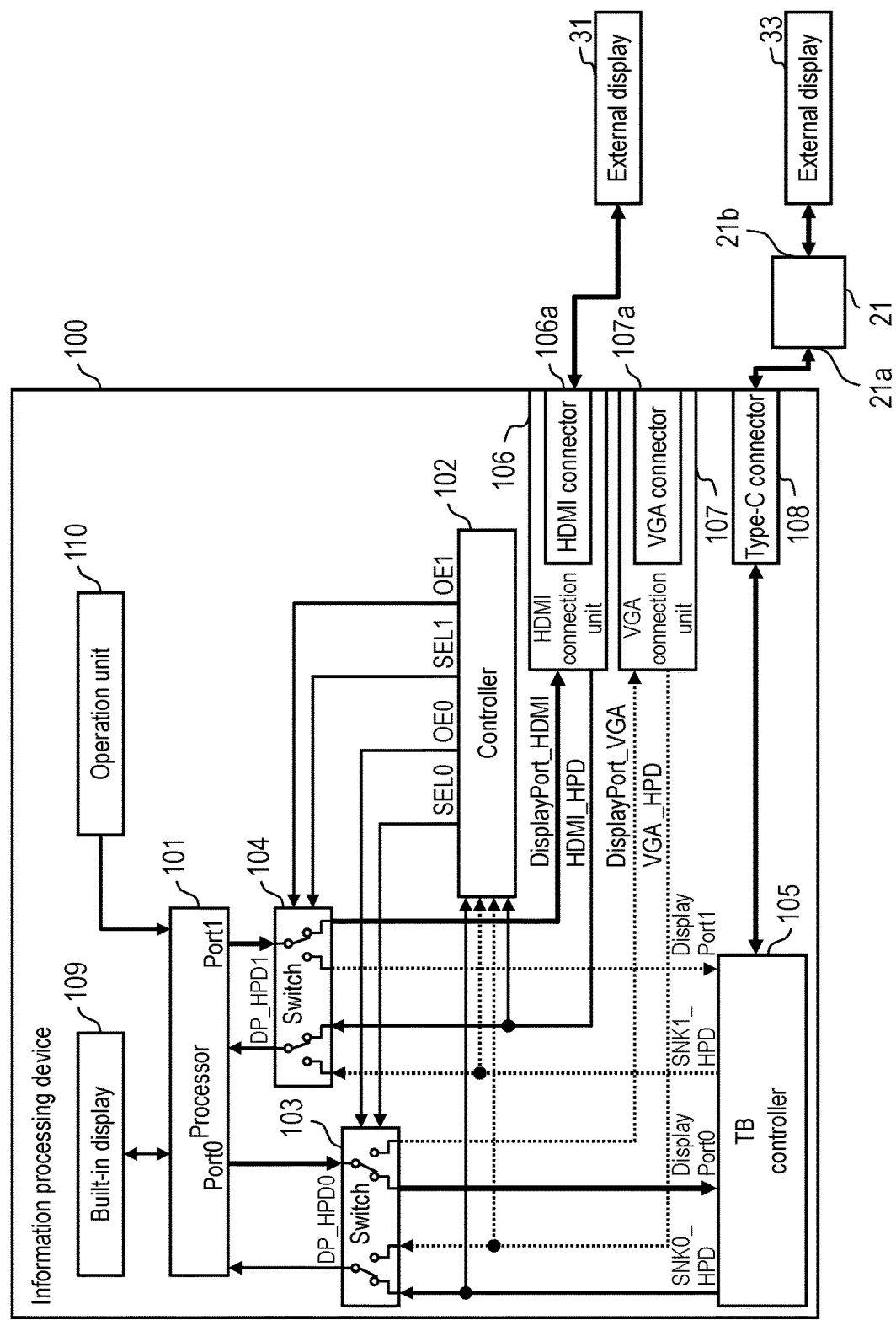
FIG. 11 is a diagram showing connection states and signal flows in another exemplary embodiment in which one external display 33 and Type-C connector 108 are connected via converter 21.

In the first exemplary embodiment, converter 20 connects up to two external displays 33, 34 to Type-C connector 108 of information processing device 100. As shown in FIG. 11, the converter may connect only one external display 33 to Type-C connector 108 of information processing device 100.

The exemplary embodiments have been described above as examples of the technique in the present disclosure. For that purpose, the accompanying drawings and detailed descriptions have been provided.

Accordingly, the constituent elements described in the accompanying drawings and the detailed description may include not only the constituent elements essential for solving the problem but also constituent elements that are not essential for solving the problem in order to illustrate the technique. It should not be therefore determined that the unessential constituent elements in the accompanying drawings and the detailed description are essential only based on the fact that these constituent elements are included in the drawings and the description.

The above exemplary embodiments are provided to exemplify the technique according to the present disclosure, and various changes, replacements, additions, omissions, and the like can be made within the scope of the claims and equivalents thereof.

REFERENCE MARKS IN THE DRAWINGS 31 to 34 external display
100 information processing device
101 processor
102 controller
103, 104 switch
105 TB controller
106a HDMI connector
107a VGA connector
108 Type-C connector

The invention claimed is:
1. An information processing device comprising:
a processor having a plurality of output ports configured to output video signals;

a plurality of connectors configured to be connected to a plurality of external displays and output the video signals to the plurality of connected external displays;

a plurality of detectors for detecting connection states of the plurality of connectors to the plurality of external displays;

a plurality of switches that intervene between the plurality of output ports and the plurality of connectors and switch paths between the plurality of output ports and the plurality of connectors; and a controller for controlling a switching operation of the plurality of switches, wherein the controller has setting information that defines a relationship between the connection states of the plurality of connectors and at least one connector that outputs at least one of the video signals among the plurality of connectors, the controller controls the switching operation of the plurality of switches based on the connection states detected by the plurality of detectors and the setting information, the setting information is set by a user, the setting information includes a plurality of tables and designation information that designates one of the plurality of tables, each of the plurality of tables defines a plurality of combinations of the connection states of the plurality of connectors and at least one connector that outputs at least one of the video signals among the plurality of connectors, the designation information is set by the user, and the controller controls the switching operation of the plurality of switches based on the connection states detected by the plurality of detectors and the one table designated by the designation information.

2. The information processing device according to claim 1, wherein the plurality of connectors include at least two of a first connector that outputs a video signal conforming to an HDMI standard, a second connector that outputs a video signal conforming to a VGA standard, and a third connector that outputs a video signal conforming to a Thunderbolt3 standard.

3. The information processing device according to claim 1, wherein the plurality of output ports include a first output port and a second output port, the plurality of switches include a first switch and a second switch, the plurality of connectors include a first connector, a second connector, and a third connector, the first switch intervenes between the first output port and the second connector and between the first output port and the third connector, the first switch is configured to switch a path between the first switch and the second connector and a path between the first switch and the third connector, the second switch intervenes between the second output port and the first connector and between the second output port and the third connector, and the second switch is configured to switch a path between the second switch and the first connector and a path between the second switch and the third connector.

4. The information processing device according to claim 3, wherein the first connector outputs a video signal conforming to an HDMI standard, the second connector outputs a video signal conforming to a VGA standard, and the third connector outputs a video signal conforming to a Thunderbolt3 standard.

5. A method of switching connectors that output video signals in an information processing device having a plurality of connectors connected to a plurality of external displays, the method comprising:

storing, on a recording medium, setting information that is set by a user and that defines a relationship between connection states of the plurality of connectors and at least one connector that outputs at least one of the video signals among the plurality of connectors, wherein the setting information includes a plurality of tables and designation information that designates one of the plurality of tables;

detecting the connection states of the plurality of connectors to the plurality of external displays; and determining at least one connector that outputs at least one of the video signals among the plurality of connectors based on the detected connection states and the setting information.

6. The method of switching connectors according to claim 5, wherein the plurality of connectors include at least two of a first connector that outputs a video signal conforming to an HDMI standard, a second connector that outputs a video signal conforming to a VGA standard, and a third connector that outputs a video signal conforming to a Thunderbolt3 standard.

7. The method of switching connectors according to claim 5, wherein each of the plurality of tables defines a plurality of combinations of the connection states of the plurality of connectors and at least one connector that outputs at least one of the video signals among the plurality of connectors.

* * * * *